United States Patent [19]

Eves et al.

[11] 4,348,806

[45] Sep. 14, 1982

[54] SELECTIVE CONTACT CRIMPER

[75] Inventors: William J. Eves, Woodinville; Luis J. Lazaro, Jr., Seattle, both of Wash.

[73] Assignee: The Boeing Company, Seattle, Wash.

[21] Appl. No.: 130,791

[22] Filed: Mar. 17, 1980

[51] Int. Cl.[3] ........................ H01R 43/04; B23P 19/00

[52] U.S. Cl. ........................................ 29/863; 29/753; 29/748; 72/112; 72/424; 198/391

[58] Field of Search ................. 29/753, 759, 757, 809, 29/863, 748, 751; 198/445, 391, 380, 389; 221/160; 72/112, 117, 446, 447, 424; 70/175 A, 175 R

[56] References Cited

U.S. PATENT DOCUMENTS

| | | | |
|---|---|---|---|
| 3,084,780 | 4/1963 | Whitney, Jr. | |
| 3,460,230 | 8/1969 | Moulin | 29/753 X |
| 3,643,327 | 2/1972 | Jackson | 29/753 X |
| 3,664,173 | 5/1972 | Haucke et al. | 29/753 X |
| 3,733,883 | 5/1973 | Kaczmarek | 29/759 X |
| 3,963,456 | 6/1976 | Tsuchiya et al. | 221/266 X |
| 4,182,030 | 1/1980 | Mullins | 29/809 X |
| 4,236,302 | 12/1980 | Kuehling | 29/753 |

*Primary Examiner*—Francis S. Husar
*Assistant Examiner*—Carl J. Arbes
*Attorney, Agent, or Firm*—Morris A. Case; Bernard A. Donahue

[57] ABSTRACT

A pair of feeder bowls are placed one above the other to simultaneously feed two different types of wire contacts onto two different tracks, and into separate alignment openings in a guide block. A pivotally mounted crimper is selectively moved to position the crimper head over the selected alignment opening. A rod extending from the crimper automatically positions a selector bar to actuate a plunger rod to move the selected contact into position to be crimped.

17 Claims, 13 Drawing Figures

Fig. 3
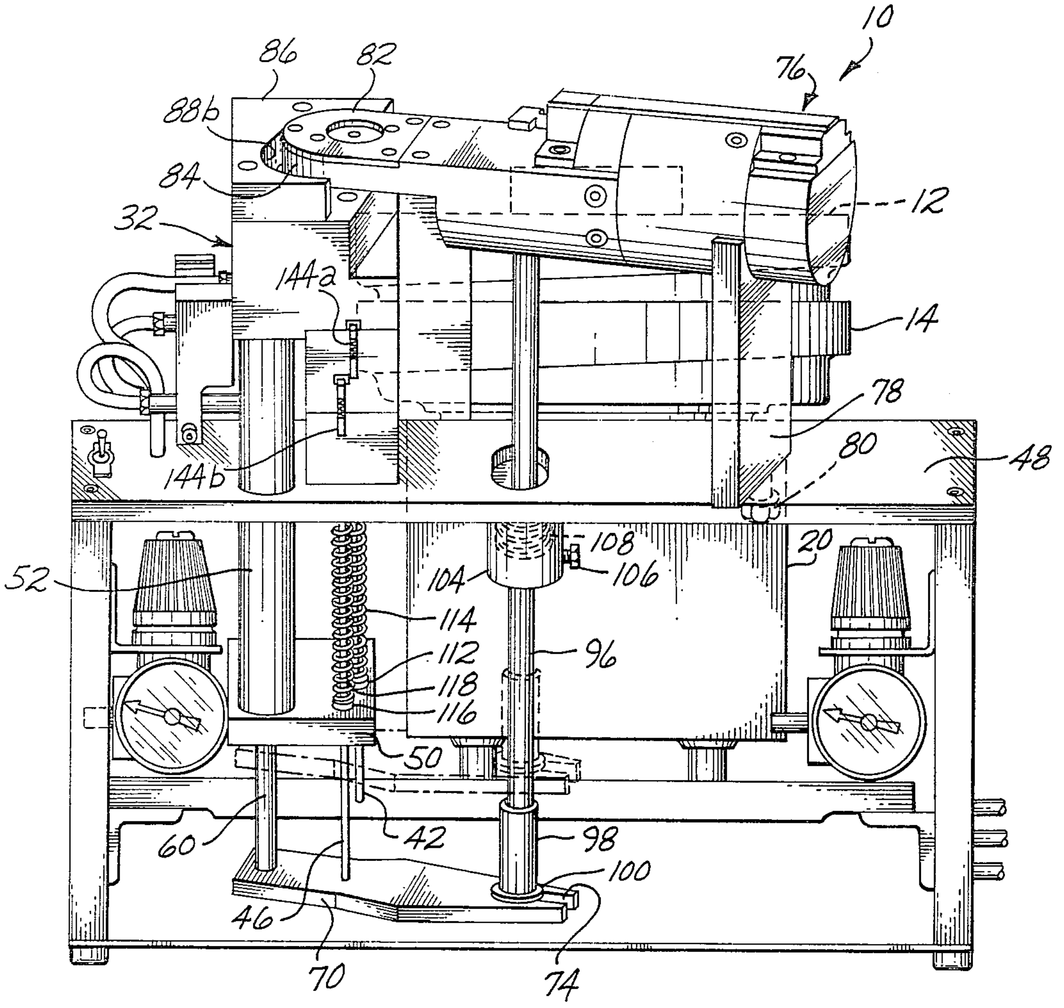
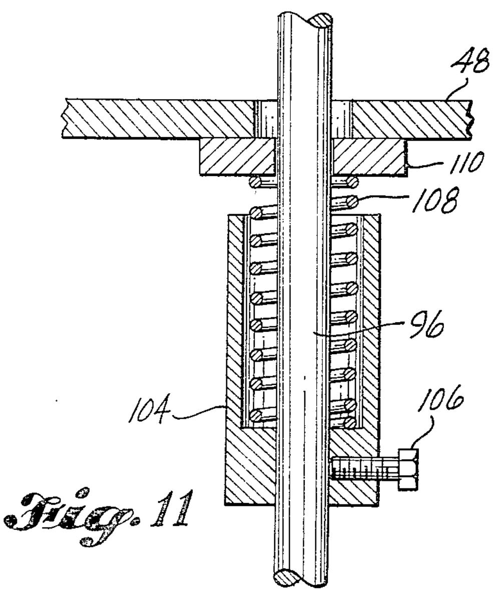
Fig. 11
Fig. 12
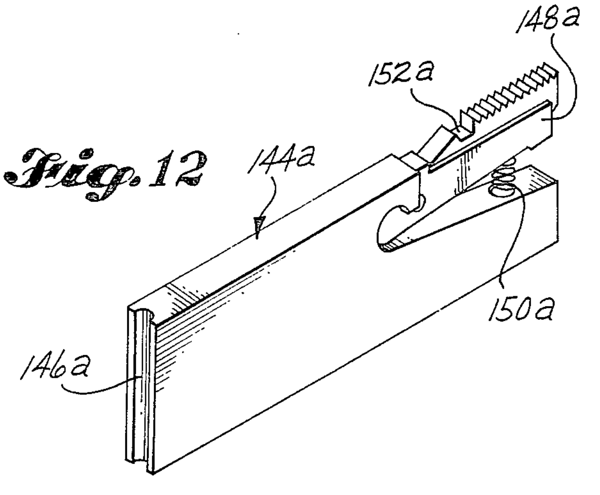

SELECTIVE CONTACT CRIMPER

BACKGROUND OF THE INVENTION

Contacts for crimping to wire ends may be in the form of a pin or a socket. If one wishes to change from one form to the other during crimping operation it is necessary to either have two separate lines with two separate crimpers or one must purge the line of the one type of contact and replace it with the other.

It is known to use vibratory bowl feeders to bulk feed wire contacts into position for crimping, U.S. Pat. No. 3,084,780 teaches orienting feeding and crimping insulated terminal connectors, and there are suppliers that provide bowl feeding units. At least one supplier has two vibratory bowls mounted one on top of the other for feeding separate lines of parts for an assembly type of operation.

SUMMARY OF THE INVENTION

Two concentric bowls are mounted with one on top of the other, and are vibrated to bulk feed contacts from each bowl onto a separate track leading into alignment holes in a guide block. A crimper is pivotally mounted to permit the crimping head to be positioned over one or the other of the alignment holes in the guide blocks. A plunger raises the aligned contact up into the crimper head to be crimped to a wire.

It is an object of this invention to provide a crimping apparatus for selectively crimping one of two different contacts in a common crimping head.

It is another object of this invention to provide a method for selectively crimping one of two different contacts in a common crimping head.

DESCRIPTION OF THE DRAWINGS

FIG. 3 shows a side elevational view of the invention.

FIG. 11 shows a blown up fragmented detailed view of a portion of FIG. 3.

FIG. 12 shows a perspective view of a snap out plug used in this invention.

DETAILED DESCRIPTION

Figure 1:
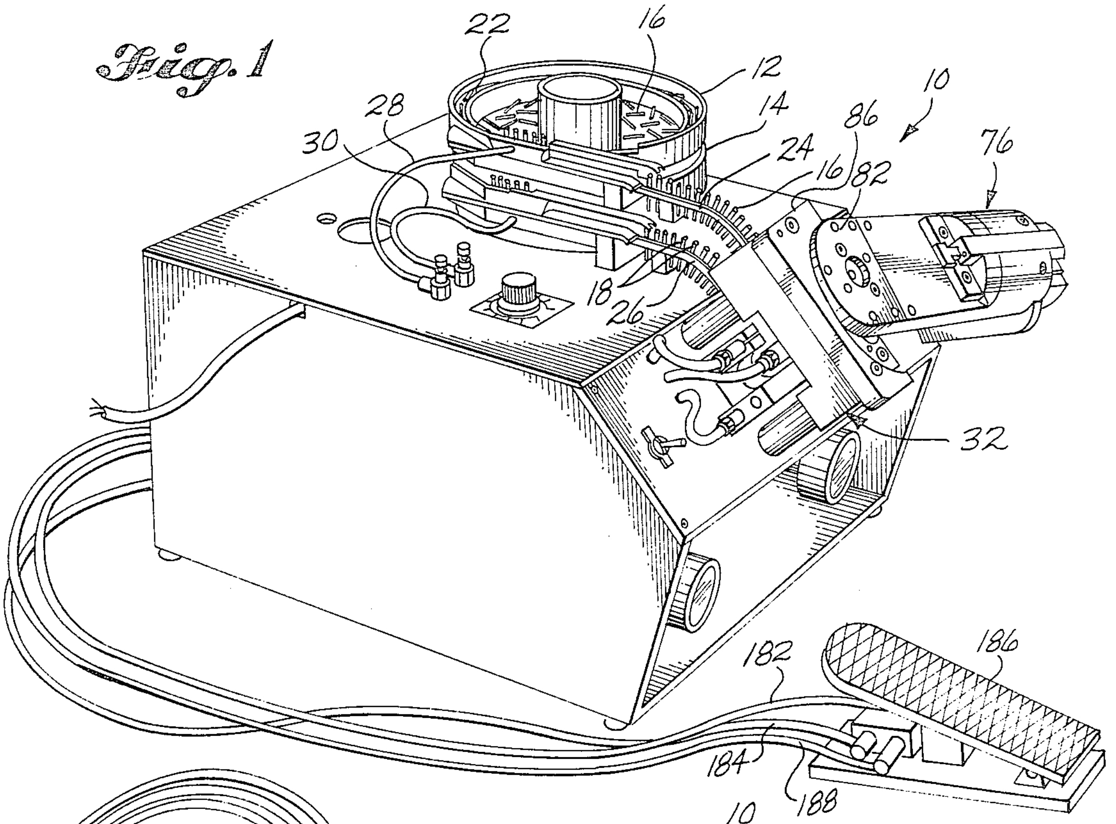
FIG. 1 shows a perspective view of the crimping device of this invention.
Figure 2:
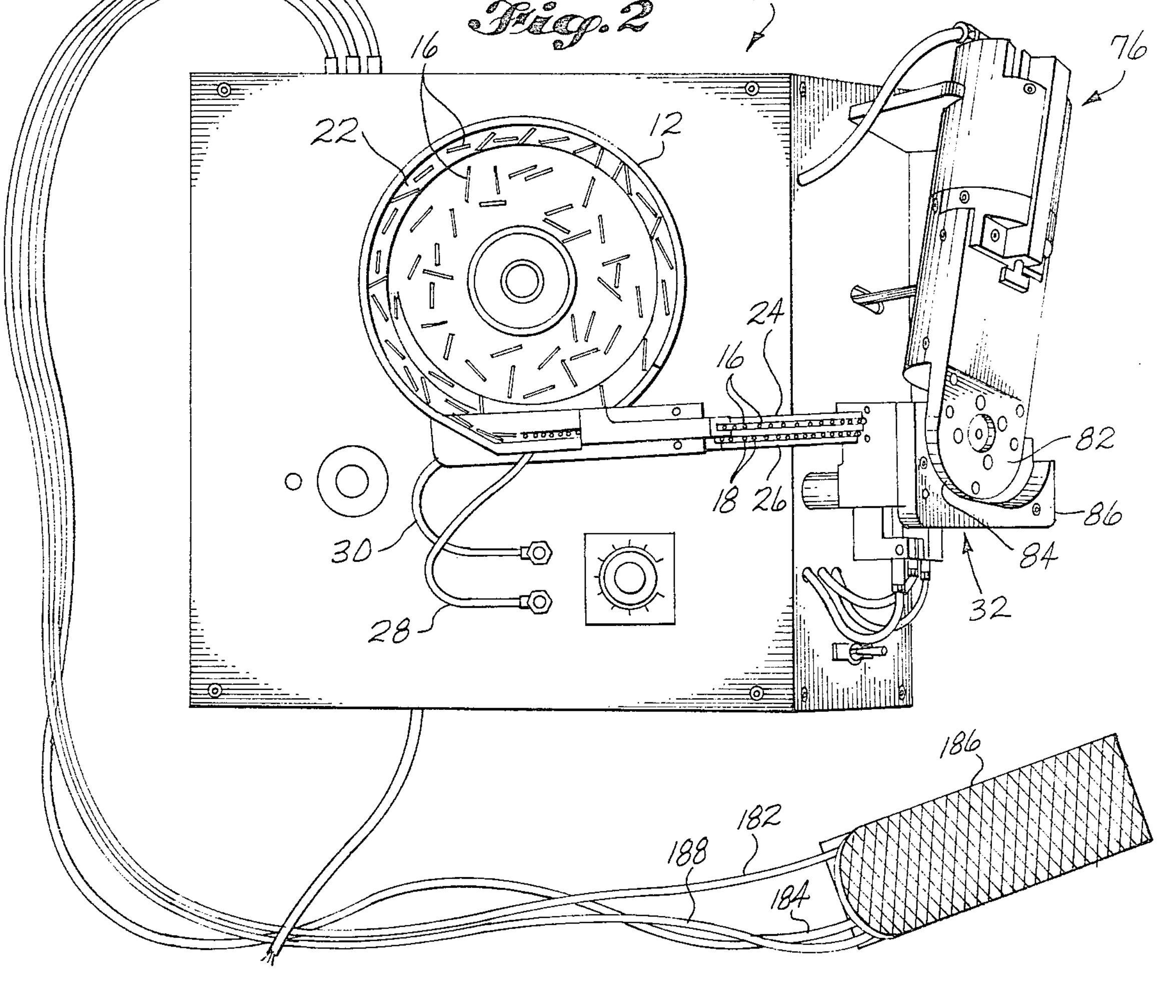
FIG. 2 shows a plan view of the invention as shown in FIG. 1.
Figure 10:
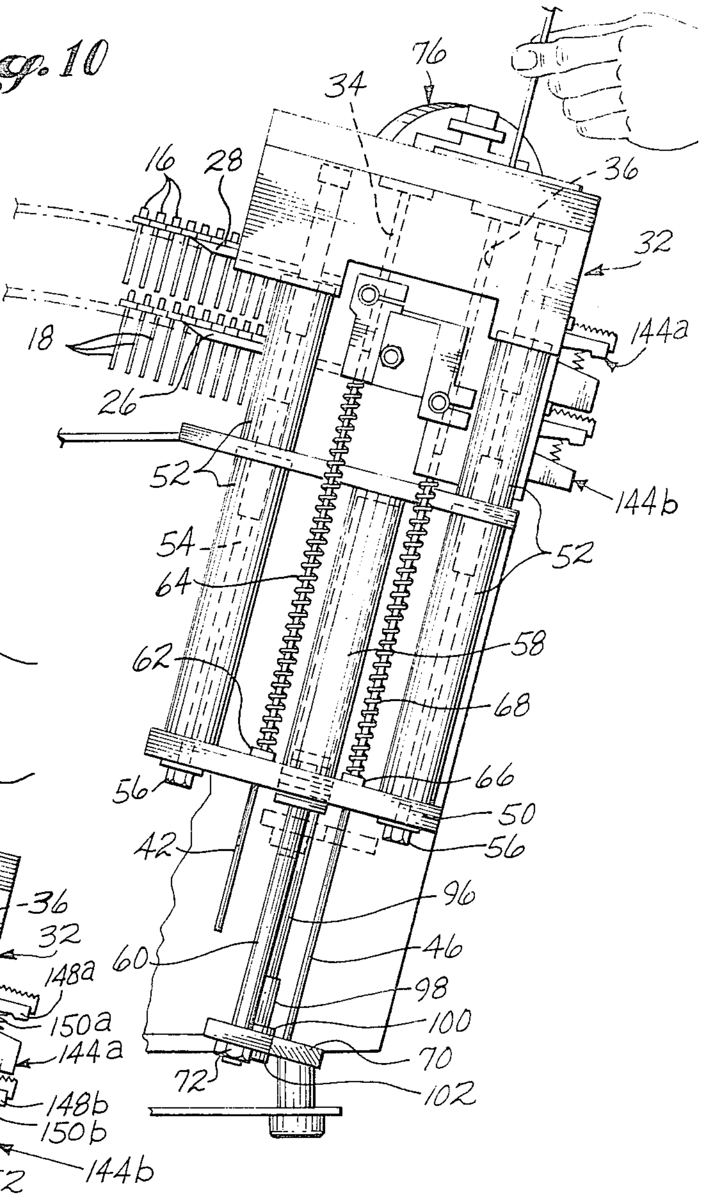
FIG. 10 is a fragmented end elevational view showing the crimper head aligned for crimping a second line of wire contacts.
Figure 4:
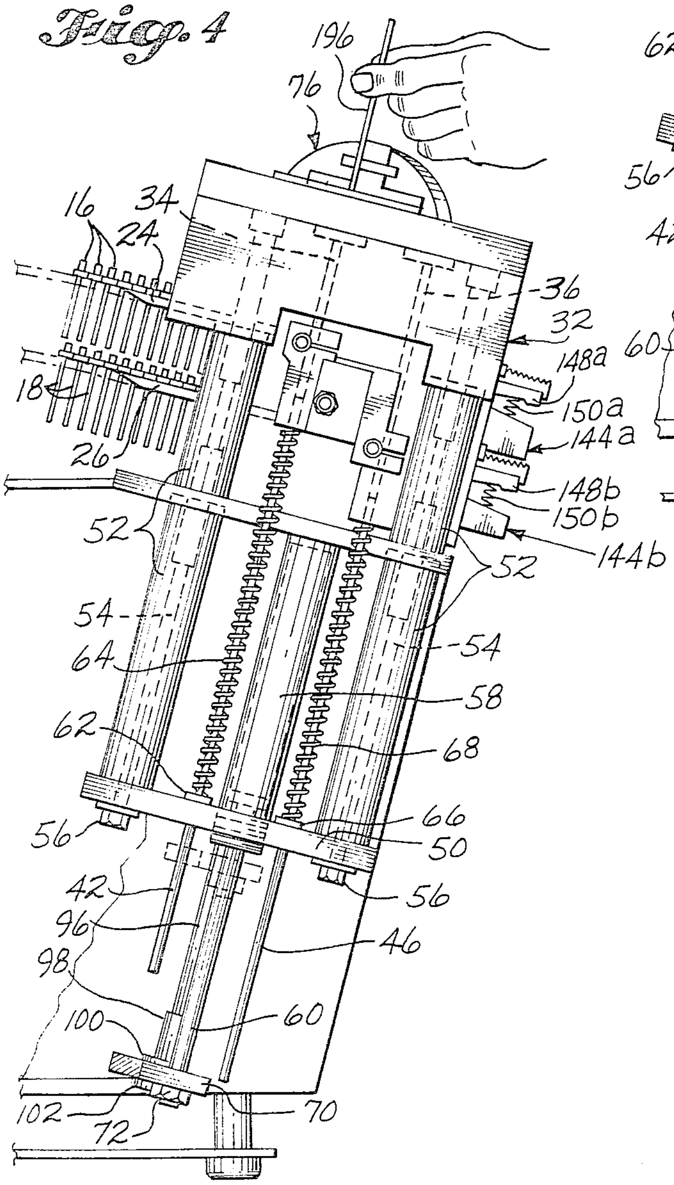
FIG. 4 is a fragmented end elevational view showing the crimper head aligned for crimping a first line of wire contacts.
Figure 5:
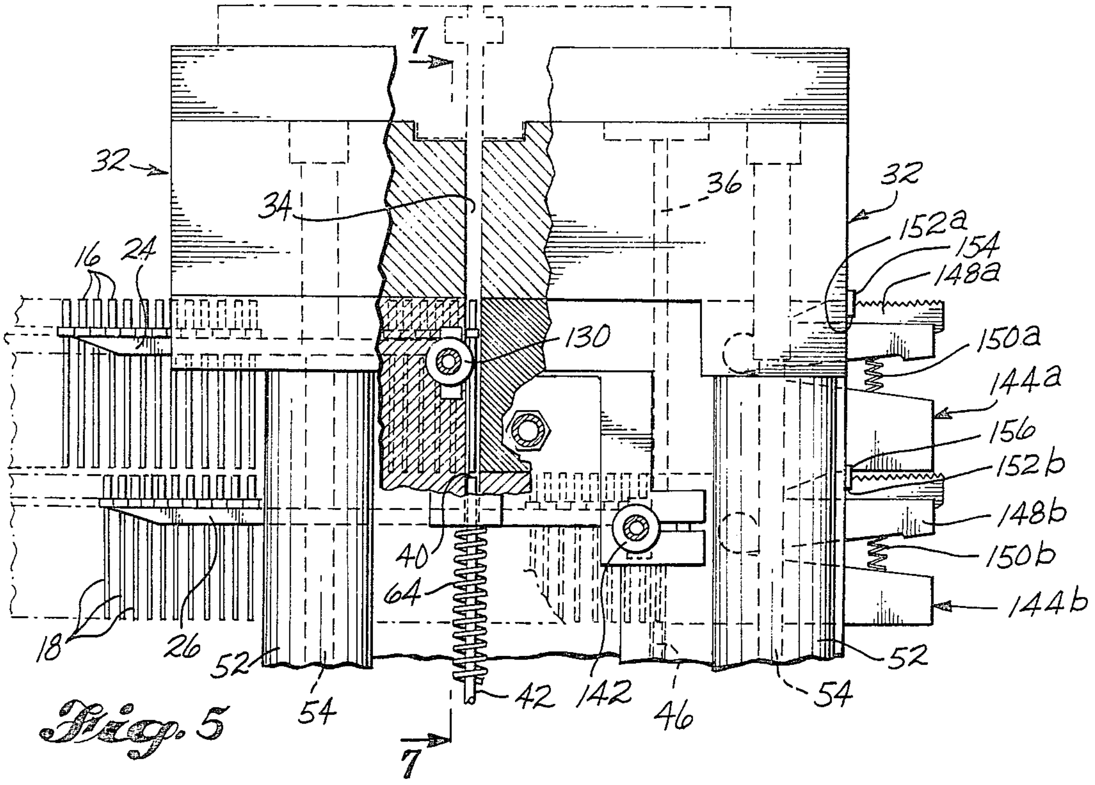
FIG. 5 shows a view as in FIG. 4 that is blown up, is partially in section, and shows a contact in initial position.
Figure 6:
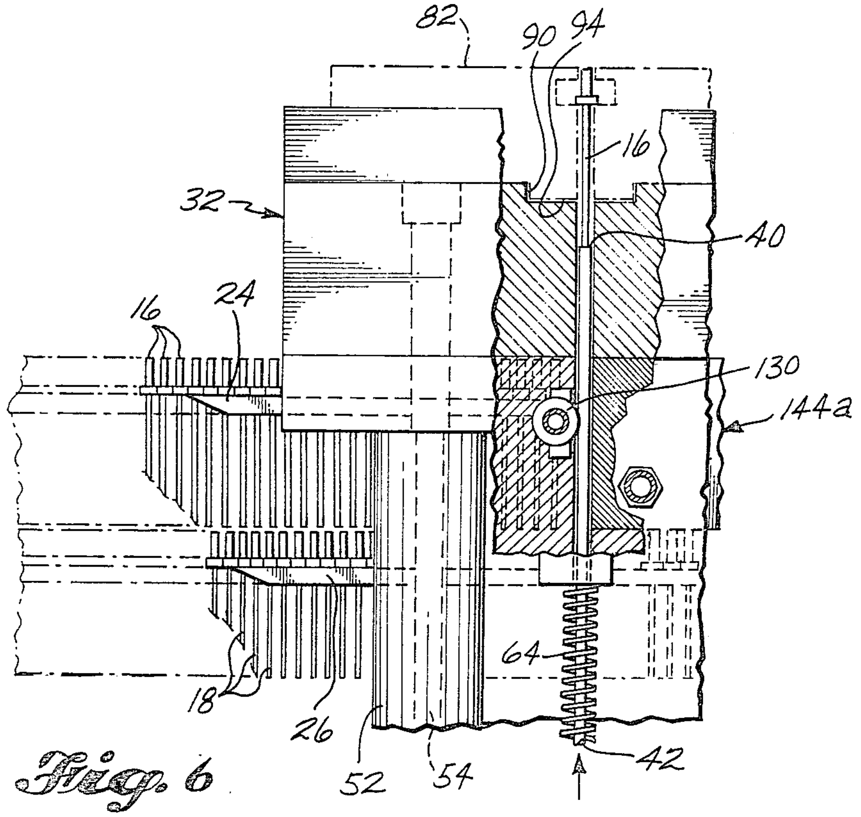
FIG. 6 shows a fragmented view of the view shown in FIG. 5 with the contact in crimping position.

A double feed crimping device 10, has a bulk feed bowl 12, concentrically mounted over a second bulk feed bowl 14. Two bowls are used with electrical contact pins 16 in one bowl, and electrical contact sockets 18 in the other bowl with the pins in this embodiment shown in bowl 12 and the sockets in bowl 14. The bowls are mounted to a vibratory elevator unit 20. The contacts are placed in the bottom of the bowls, the vibration moves the contacts up the inclined tracks 22 near the outer diameter of each bowl where properly aligned contacts transfer onto rails with the contact pins 16 from bowl 12 passing onto guide rails 24, and contact sockets 18 from bowl 14 passing onto guide rails 26. Contacts that are not properly aligned are automatically blown back into the bowl by air from lines 28 or 30 before passing onto the guide rail. The guide rails 24 and 26 each move downward to be on an inclined plane at about 45 degrees, and each terminates inside a guide block 32 with rail 24 terminating at alignment opening or reference hole 34, and rail 26 terminating at alignment opening or reference hole 36. The continuous feeding in combination with the inclined rails mean the consecutive contacts maintain a continuous feeding movement with the last contact located in the alignment opening in the guide block. The contact in opening 34 is adjacent an end 40 of a plunger, or guide rod 42, axially mounted with respect to the opening, and the contact in opening 36 is adjacent an end 44 of a plunger, or guide rod 46, axially mounted with respect to the opening.

The guide block 32 is mounted to housing 48, and to a guide bar 50, through use of sleeves 52, and a pair of bolts 54 joined with nuts 56. A pneumatic cylinder 58, extends from the guide block to the guide bar, and is mounted to those members with piston rod 60 of the cylinder extending through the guide bar parallel to plungers 42 and 46. Those plungers are slideably mounted in and extend past the guide bar. Plunger 42 has a joined collar 62 and spring 64, and plunger 46 has a joined collar 66 and spring 68 with the collars and springs located to position the plungers with the ends 40 and 44 respectively adjacent the aligned contact in the reference holes 34 and 36. A selector bar 70 is joined with bolt 72 near one end of the bar to the end of the piston rod, and is slotted 74, at the other end of the bar.

A crimper 76 is mounted, near one end to a saddle or support member 78, which in turn is mounted with bolt 80 to housing 48 to permit the crimper to pivot. The crimping head 82 is located at the opposite end from the pivot area, and is rounded at 84 on its end. The guide block 32 has a plate 86 shaped to accommodate the crimper head as it is rounded at 88*a* and 88*b* to match the rounded end of the crimper head whether the head is aligned with reference hole 34 or 36. To also assist with alignment of the crimper head, in one or the other of the referenced positions, the guide block has a circular recess 90 concentric with reference hole 34, and another circular recess 92 concentric with reference hole 36. The crimper head in turn has an adapter bushing 94 sized to locate into and match with one or the other of the recesses. Intermediate the ends of the crimper, a rigidly fastened rod 96 extends downward through the recess 74 in selector bar 70. A bushing 98 fits over the end of the rod 96, freely slides up and down on that rod and is upended at 100 and 102 to secure the bushing in the recess of the selector bar. A spring cup 104 is secured to the rod with a set screw 106, a compression spring 108 locates in the cup and extends upward to contact a thrust washer 110; which in turn abuts the underside of housing 48. The crimper is mounted on the saddle member 78 in a manner such that the crimper head may be raised from one alignment position, pivoted to the second alignment position, and the spring will hold the head adapter bushing in the circular recess at the new position. When the crimper head is moved from one alignment position to the other rod 96 moves against bushing 98 to pivot the selector bar around the piston rod 60, the selector bar is sized to have width such that when the crimper head is aligned with reference hole 34 the selector bar will be located to be directly under an axial extension of plunger rod 42, but will not be under an axial extension of plunger rod 46, and when the crimper head is moved to be aligned with reference hole 36 the alignment with respect to the plunger rods will be reversed; so that the selector bar will then be under rod 46, but not under rod 42. A collar 112 rests on top of guide bar 50, securely fastens to plunger rod 42, and a compression spring 114 extends from the guide rod to the housing. A collar 116 rests on top of guide bar 50, fastens to plunger rod 46, and a compression spring 118 extends from the guide rod to the housing.

Figure 7:
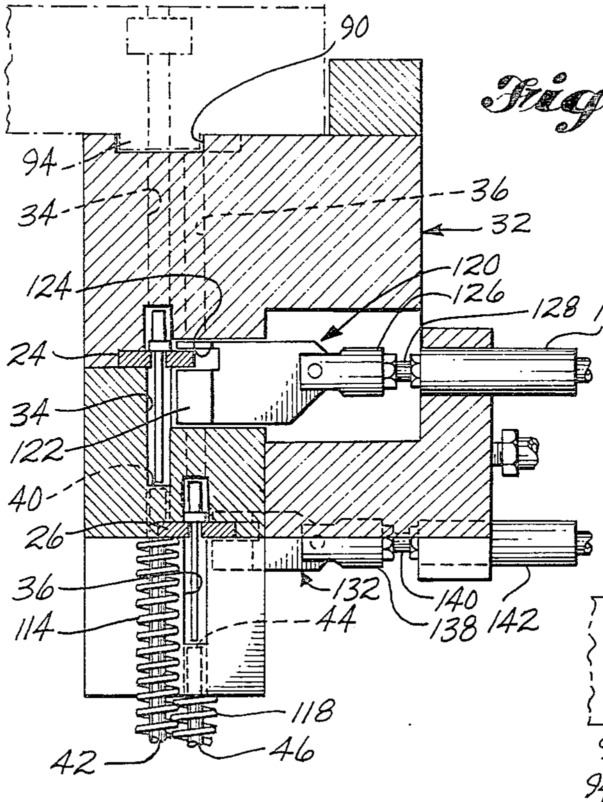
FIG. 7 shows a first step sectional view taken along lines 7—7 of FIG. 5.
Figure 8:
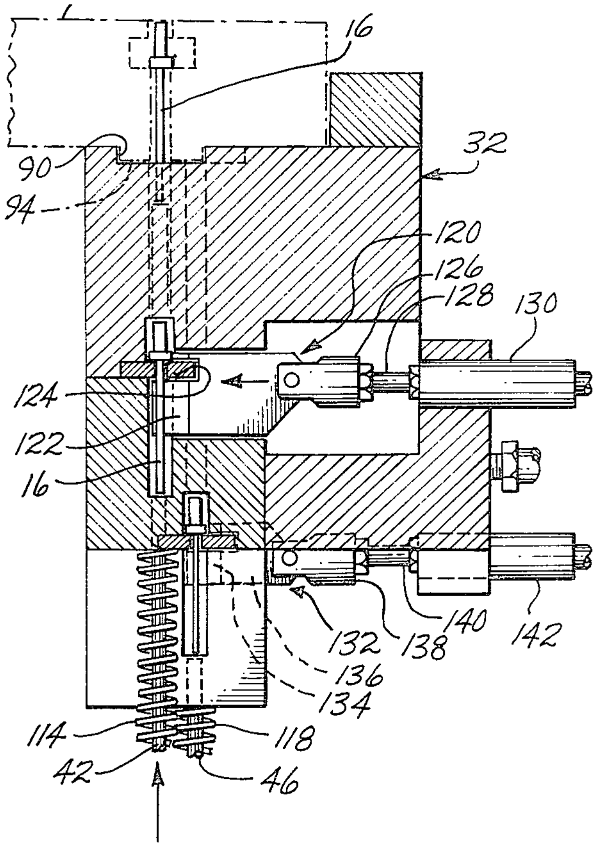
FIG. 8 shows a second step of the view as shown in FIG. 7.
Figure 9:
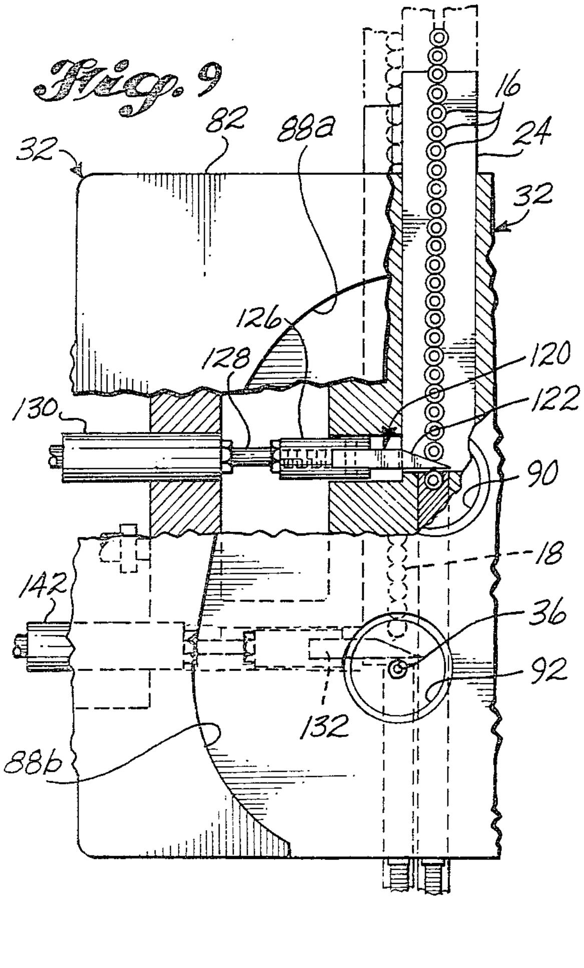
FIG. 9 shows a fragmented plan view partially in section.

As the electrical contacts 16 and 18 consecutively advance to the reference hole along their respective rails a pair of gates as, best shown in FIGS. 7 through 9, are located to hold up succeeding contacts to prevent interference with the contact in the aligned position. The contact pins 16 are controlled by gate 120 which is shaped with a beveled surface 122 to move and to hold back the succeeding pins. The gate is slotted at 124 to permit the gate to clear rails 24 when in the advanced position. The gate is joined by coupler 126 to piston rod 128 of pneumatic cylinder 130. The contact sockets are similarly controlled with gate 132 having beveled surface 134 and slot 136. The gate has coupling 138 joining it to piston rod 140 of pneumatic cylinder 142.

Snap out contact plugs 144*a* and 144*b* are sized to snap into the guide blocks 32 and act as a quick release for removing jammed contacts. These plugs are similar in shape and are best shown in FIG. 12 where plug 144*a* has recessed end 146*a*, shaped to form a continuation of the reference hole 34, so that a positioned contact pin abuts against that surface. The plug has a pivotable member 148*a* acted against by spring 150*a* and a slot 152*a* located to match a projection 154 on the guide block. The socket pin 144*b* has similar numbered parts followed by the letter b, and the plug mates with projection 156 on the guide block.

Figure 13:
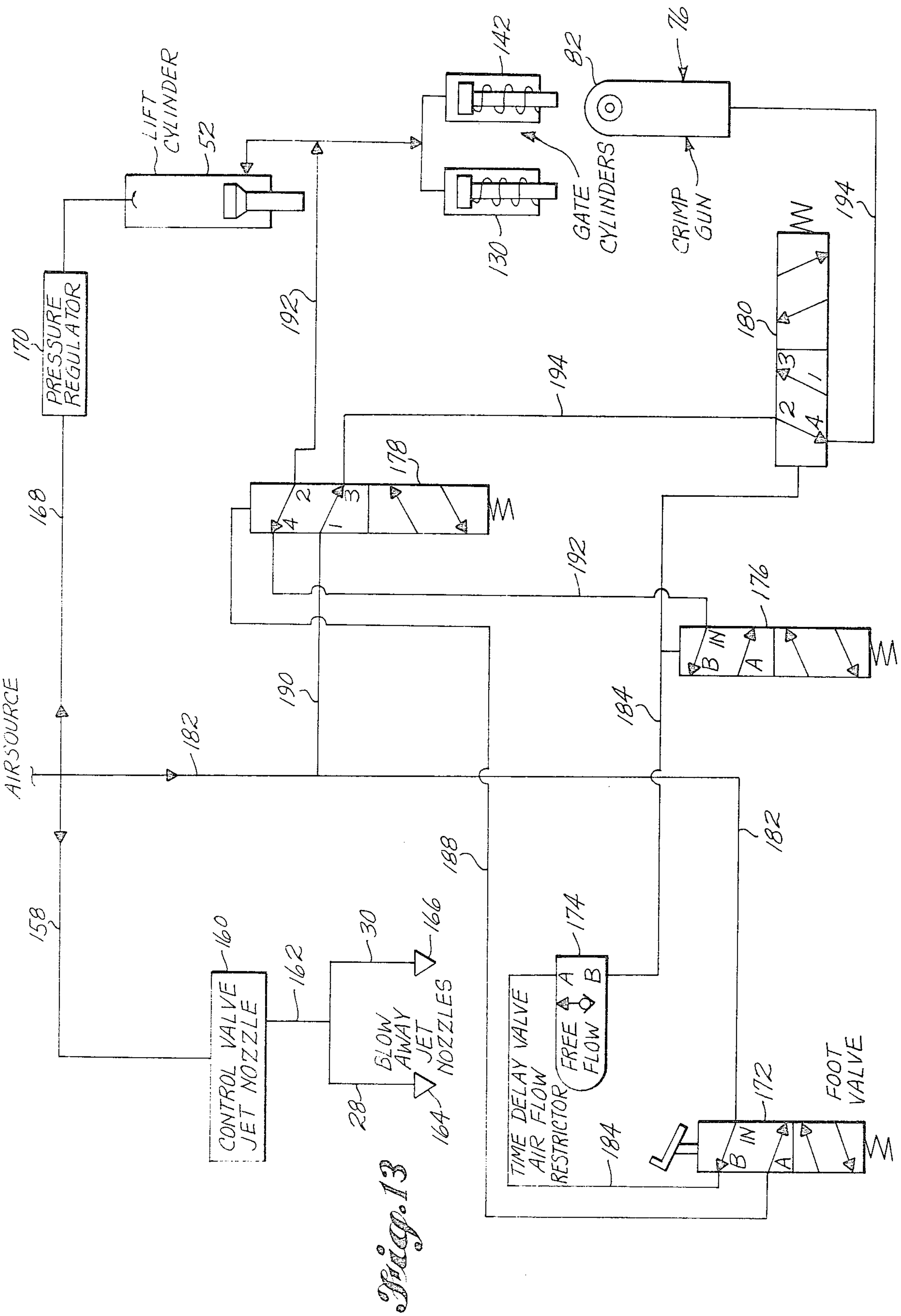
FIG. 13 shows a schematic of the controls for the crimping device of this invention.

FIG. 13 shows a schematic of the air control for the invention. Compressed air from a source not shown passes through line 158, control valve 160, line 162, and lines 28 and 30, and nozzle 164 and 166 for blowing contacts not properly aligned back into the bowls. Air also is directed through line 168 into pressure regulator 170 thence into an end of cylinder 52. The sequencing is controlled by five valves, 172, 174, 176, 178 and 180. As air enters through line 182 it passes through valve 172 and 174 and then through line 184 where it actuates valves 176 and 180. When the foot pedal 186 for valve 172 is depressed it exhausts air from line 184 through valve 172, and at the same time it introduces air through line 188 to activate valve 178 to introduce air from line 190 through line 192 to actuate gate cylinders 130 and 142 and lift cylinder 52. The air pressure from the pressure regulator 170 is lower than the pressure in line 192; so the gate cylinders actuate before the lift cylinder. When the foot pedal is released valve 172 is reversed to exhaust line 188 and to deactivate valve 178. This permits compressed air to pass from line 190 through valve 178, line 194, and valve 180 to actuate the crimper head. Time delay valve 174 permits a delayed buildup in pressure in line 184; which opens valve 176 to exhaust air from 192 to permit the gate cylinders and the lift cylinder to return to starting position, and to close valve 180 to release the crimper head. In operation an operator places contact pins 16 in bowl 12 and contact sockets in bowl 14. The vibrator 20 and compressed air is turned on and the contacts automatically feed their respective tracks 24 and 26. The crimper head 82 is positioned over the desired contact alignment opening 34 or 36; which automatically positions the selector bar 70 to permit contact with plunger 42 or 46 whichever is aligned with the selected opening. The foot pedal is depressed which actuates the gate 120 and 132 then raises the selector bar to actuate the proper plunger and raise the contact into crimping position. A wire end 196, to be crimped is inserted into the contact, the pedal released which first crimps the contact onto the wire end, then returns the plunger and the gates to starting position. To change from one type of contact to the other the operator raises the crimper head, moves it to the alternate location and lets it go so it will be pulled into position at the new location.

We claim:

1. An apparatus for selectively crimping one of a pair of contacts comprising: means for automatically feeding a succession of first wire contacts to a first reference hole in a guide block, means for automatically feeding a succession of second wire contacts to a second reference hole in the guide block, a crimping device above the guide block and pivotally mounted on said apparatus to permit selectively positioning a crimping head in alignment with one of the reference holes in the guide block, and means for selectively moving one of the wire contacts in the reference hole up to the aligned crimping head for crimping to a wire end.

2. An apparatus for selectively crimping one of a pair of contacts comprising: means for automatically feeding a succession of first contacts from a first vibratory bowl to a first reference hole in a guide block, means for automatically feeding a succession of second contacts from a second vibratory bowl to a second reference hole in the guide block, a crimping device above the guide block and pivotally mounted on said apparatus to permit selectively positioning a crimping head in alignment with one of the reference holes in the guide block, a first guide rod located adjacent the contact in the first reference hole, and a second guide rod located adjacent the second contact in the second reference hole, means for selectively moving one of the guide rods for advancing the contact up the reference hole and into the alignment crimping head where the contact is crimped to a wire end in a crimping cycle.

3. An apparatus for selectively crimping one of a pair of contacts as in claim 2 wherein the apparatus further comprises means for holding back contacts succeeding the contact in the first reference hole during part of the crimping cycle, and means for holding back contacts succeeding the contact in the second reference hole during part of the crimping cycle.

4. An apparatus for selectively crimping one of a pair of contacts comprising: means for automatically feeding a line of succeeding first contacts to a first reference hole in a guide block, means for automatically feeding a line of succeeding second contacts to a second reference hole in the guide block, a first plunger located to axially extend up into the first reference hole with an end of the plunger adjacent the contact, a second plunger located to axially extend up into the second reference hole with an end of the plunger adjacent the contact, a crimping device located above the guide block and pivotally mounted on said apparatus to permit selectively positioning a crimping head in alignment with one of the reference holes in the guide block, means for moving a selector bar upward to press against and raise one of the plungers for positioning the contact in the crimper head, means joined to the crimper device for aligning the selector bar to only move the plunger in alignment with the crimper head, and means for actuating the crimper head to crimp the contact to a wire terminal.

5. An apparatus for selectively crimping one of a pair of contacts as in claim 4 wherein one line of succeeding contacts are pins, and the other line of succeeding contacts are sockets.

6. An apparatus for selectively crimping one of a pair of contacts as in claim 5 wherein a pair of gates are mounted for reciprocal movement with the gates acting to move forward and thereby hold back a first line and a second line of succeeding contacts and acting to retract and thereby permitting advancement of the contacts.

7. An apparatus for selectively crimping one of a pair of contacts comprising: a guide block having a pair of parallel holes extending therethrough, a pneumatic cylinder mounted to the guide block to extend downward with a piston rod of the pneumatic cylinder parallel to the holes in the guide block, a laterally extending selector bar mounted adjacent one end to the piston rod and having a slot in the opposite end, a pair of plungers resiliently mounted parallel to each other with one end extending up into and part way through the parallel hole in the guide bar and the opposite end extending downward toward the selector bar, a crimper pivotally mounted on said apparatus to permit moving the crimping head into alignment over either of the parallel holes in the guide block and the crimper having a rod extending downward into the slot in the selector bar to rotate the bar under a first plunger aligned with a selected hole in the guide block, means for feeding succeeding wire contact over guide rails from feed bowls to each of the parallel holes, means for actuating the pneumatic cylinder to raise the contacts into position for crimping, and means for actuating the crimper.

8. An apparatus for selectively crimping one of a pair of contacts as in claim 7, further comprising: a first gate acting to advance and thereby hold back succeeding contacts from the contact in a first one of the parallel holes and acting to retract and thereby permitting advancement of the contacts, and a second gate located to advance to hold back succeeding contacts from the contact in the second parallel hole and to retract to permit advancement of the contacts.

9. An apparatus for selectively crimping one of a pair of contacts as in claim 8 further comprising: means for removing jammed contacts from the parallel holes in the guide block.

10. An apparatus for selectively crimping one of a pair of contacts as in claim 8, further comprising: a first snap out plug located to abut the contact positioned in the first parallel hole in the guide block, and a second snap out plug positioned to abut the contact located in the second parallel hole.

11. An apparatus for selectively crimping one of a pair of contacts as in claim 8 further comprising a separate recess in the guide block concentric to each of the parallel holes at the top of the block, a matching bushing extending downward from the crimper head to mate in each of the recesses, and resilient means mounted on the rod extending from the crimper to hold the positioned crimper in place.

12. An apparatus for selectively crimping one of a pair of contacts as in claim 8 further comprising: automatic means for sequencing the crimping by automatically advancing the gates, raising one of said plungers to position the contact in the crimper, crimping, retracting the plunger, and retracting the gates.

13. An apparatus for selectively crimping one of a pair of contacts as in claim 12 wherein pneumatic means are used to provide the automatic means.

14. A method for selectively crimping one of a pair of wire contacts, with steps comprising separately feeding two separate lines of wire contacts into terminating parallel holes in a guide block, selectively placing a crimper head of a pivotally mounted crimper into alignment with the parallel holes, raising a contact from one of said separate lines located in an aligned one of said terminating parallel holes up into the crimper, and placing a wire end into the contact and crimping.

15. A method of selectively crimping one of a pair of wire contacts as in claim 14, with further steps comprising forwarding a gate between contacts located in the terminating parallel holes and the feeding lines of contacts before raising the contact, into crimping position.

16. A method for selectively crimping one of a pair of wire contacts, with steps comprising: continuously feeding two separate lines of succeeding wire contacts from bulk feed bowls over guide rails and into and aligning in terminating parallel holes in a guide block, selectively placing a head of a pivotally mounted crimper into alignment with the parallel holes and simultaneously adjusting a selector bar through a deflector rod attached to the crimper, raising the aligned contact up into the crimper head by moving the selector bar upward against a plunger rod and pushing the plunger against the aligned contact, placing a wire end into the contact, and crimping the contact to the wire.

17. A method for selectively crimping one of a pair of wire contacts as in claim 16, with further steps comprising: holding back succeeding contacts from the contacts located in the terminating parallel holes before raising the aligned contact by advancing a gate for each line of contacts.

* * * * *